United States Patent Office.

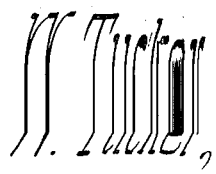
W. Tucker,
Filing Saws.
No. 106,431. Patented Aug. 16, 1870.
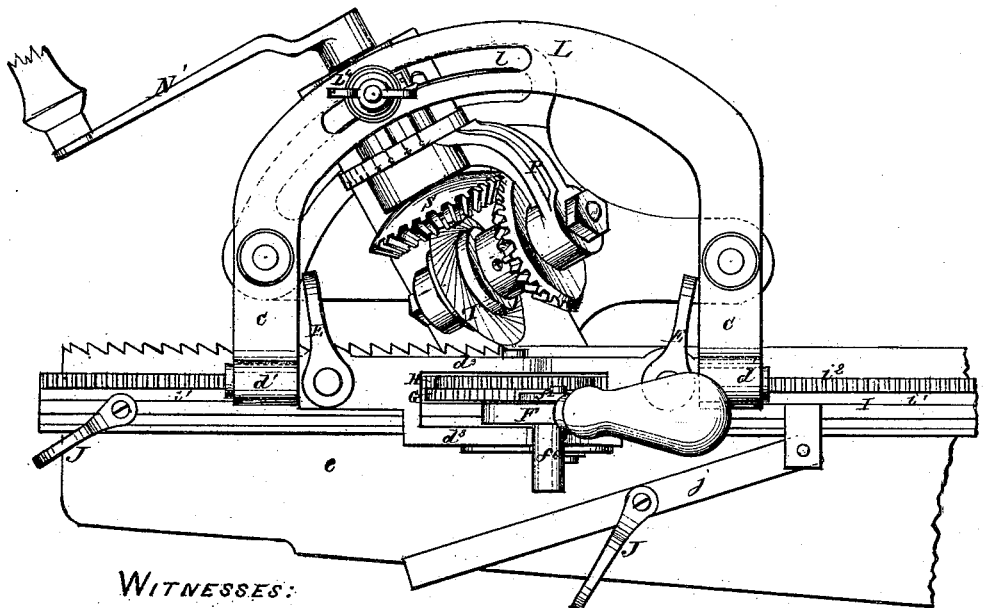
WITNESSES:
Wm H. Brereton Jr
Jas. L. Ewin
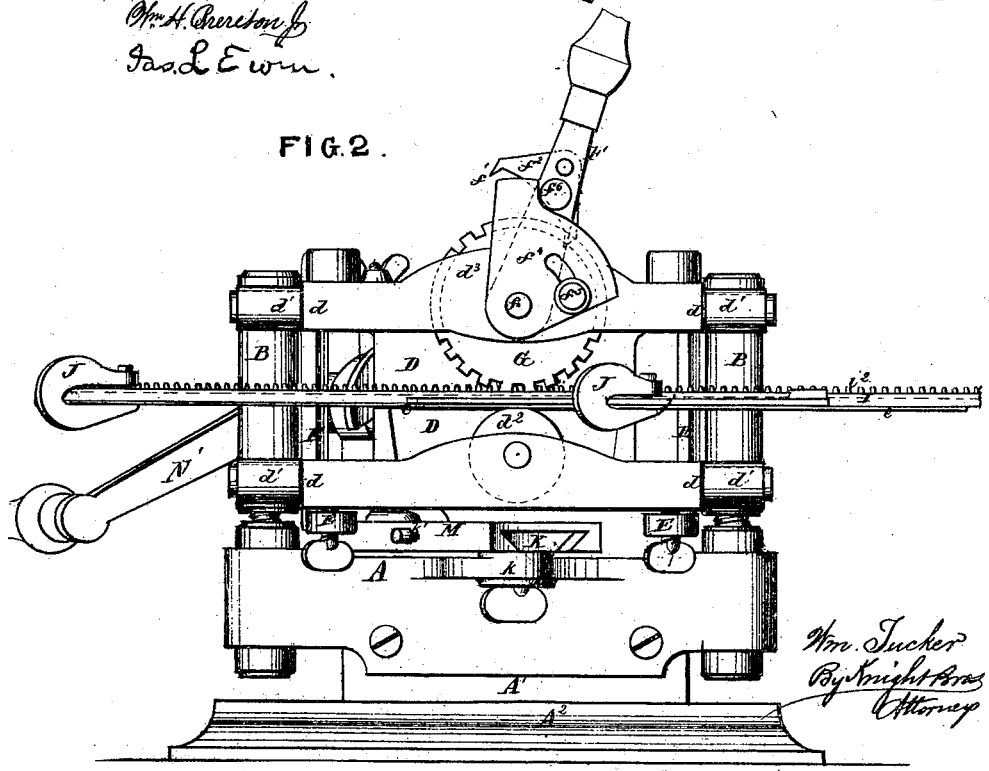
Wm. Tucker
By Knight Bros
Attorney

WILLIAM TUCKER, OF FISKEDALE, MASSACHUSETTS, ASSIGNOR TO HIMSELF AND PRINCE A. SNELL, OF PITTSBURG, PENNSYLVANIA.

Letters Patent No. 106,431, dated August 16, 1870.

IMPROVEMENT IN SAW-FILING MACHINE.

The Schedule referred to in these Letters Patent and making part of the same.

I, WILLIAM TUCKER, of Fiskedale, in the county of Worcester and State of Massachusetts, have invented an Improved Saw-filing Machine, of which the following is a specification.

Nature and Objects of the Invention.

The saw-blade is clamped to a toothed feed-bar, and is fed between adjustable guide-jaws, which hold it for the operation of the rotary cutter.

An adjustable arm on the toothed feed-bar allows the feed device to be adapted to varying breadths of blades.

The feed-wheel is upon a shaft which is reciprocally rotated, moving the blade a determinate distance, equal to the pitch of the tooth, and this distance is adjustable for saws of varying pitch.

The length of motion of the feed-lever is determined by an adjustable stop, the variation in the length of the stroke determining the pitch of the teeth.

A dog on the feed-lever has three adjustments— one for forward motion of the blade, one for backward motion, and one in which it is inactive, so far as feed is concerned.

The index-wheel and feed-wheel are upon the same axle, and the former enters a longitudinal groove in the feed-bar, so as to act as a guide, while the feed acts on the toothed feed-bar.

The jaws between which the blade slides are capable of several adjustments. First, a yielding pressure, arising from their being attached by spring arms to the frame. Secondly, a partial rotative adjustment, so that their faces may lie in the plane of the saw-blade, whatever may be the thickness of the latter. Thirdly, a positive adjustment as to relative distance, by means of clamps and set-screws.

The cutting apparatus has three adjustments. First, the length of the motion toward and from the saw-blade is adjustable, to adapt it to cutting teeth of varying depths. Secondly, the carriage of the cutter is adjustable in a horizontal plane, so as to change the presentation of the cutter to make the teeth more or less hooking. Thirdly, the cutter axis is adjustable on a plane at right angles to that of its revolution, in order to vary the obliquity of presentation of the cutter, and give the required bevel to the teeth.

The cutting apparatus, when adjusted, has two motions. First, toward and from the edge of the saw-blade, that is, to its work to cut a tooth, and away from the work to clear itself while the blade is being fed a distance equal to the pitch of a tooth. Second, the cutter rotates on its axis, and its teeth make the interdental spaces on the edge of the saw-blade.

Description of the Accompanying Drawing.

Figure 1 is a top view of the machine.

Figure 2 is an elevation of the machine on that side which exhibits the saw.

Figure 3 is a transverse vertical section.

Figure 4 is a detached view of the base-plate and of the lower jaw and wheel on which the blade traverses.

Figure 5 is a partial section and partial top view of the bed-plate of the cutter-carriage.

Figure 6 is a section through the cutter-mandrel, which is sleeved upon an axis in the stock.

General Description.

The base-plate A is shown as attached to a post, $A^1$, on a bench, $A^2$.

There are two nearly independent portions to be supported on the base-plate. One of these is to hold and feed the saw-blade; the other is the cutting apparatus.

To consider the saw-holder first—

B B are posts rising from the bed-plate A, and having flat spring arms, C C C C, to which the jaws D D are connected.

These arms have a tendency to spread apart upward and downward, but their divergence is controlled by screw-clamps E E, which bear upon the upper side of the upper jaw-piece D, and the under side of the lower jaw-piece D. This enables the distance apart of the jaw-edge to be regulated according to the thickness of the blade which is passed between them.

The jaw-pieces terminate at their ends in gudgeons, $d$, which rest in bearings $d^1$, formed at the ends of the arms C. By this means the jaws are able to adjust themselves so that their bearing edges upon the saw-blade shall lie flatly thereon.

In the lower jaw D is a roller, $d^2$, on which the saw-blade $e$ traverses.

The feeding apparatus is attached to the upper jaw D.

The feeding apparatus consists of a vibrating arm, F, adjustable dog $f^2$, an index-wheel, G, and cog-wheel H, the latter acting upon the toothed rack $i^2$ of the feed-bar I, which is dogged to the saw-blade $e$.

The horizontal axis $f$ of the lever F has its bearings in the cheeks $d^3$ of the vertical slot in the upper jaw-piece.

On the same axis is an index-wheel, G, which has a notched face for the engagement of the claws $f^1$ of the dog $f^2$. The latter is pivoted to the vibrating arm F, and is capable of being set in either of three positions, so as to move the index-wheel in one or the other direction, or to throw the dog out of engagement with the wheel.

The extent of the feed is determined by means of a sector, $f^4$, which is pivoted on the axis $f^1$, and is set to any required adjustment by a set-screw, $f^5$, which occupies an arc-slot in the sector-plate.

The downward motion of the arm F is arrested by the contact of the dog with the top of the jaw-piece. The upward motion of the lever-arm is arrested by the contact of the stud $f^6$ with a shoulder on the sector, and the position of the sector thus determines the length of the stroke, and, consequently, the amount of feed at each impulse.

On the axis $f^1$, and rigidly attached to the same, is a toothed wheel, H, which engages the rack $i^2$ of the feed-bar I.

The index-wheel G protrudes down into a long slot, $i^1$, on the upper side of the feed-bar, and forms a guide to keep the latter in line.

The saw-blade $e$ is fastened to the feed-bar I by means of dogs J. One of these nips it near the point, and others (one or more) pinch it at other points, the bar $j$, which is jointed to the feed-bar I, and capable of lateral extension, affording means of clamping the bar to the saw-blade with dogs having comparatively short jaws.

The parts concerned in the cutting of the teeth will now be described.

K is the way-plate of a carriage, and is pivoted near its front end upon the pin $k$. This forms its center of horizontal adjustment, by which the angle of presentation of the cutter to the saw is regulated, giving what is termed the hook to the tooth, that is, the degree of steepness to the face of the tooth, and the degree of slope to the back of the same.

The segmental slot $a$ in the lower plate A, fig. 4, and the segmental slot $l$ in the upper curved plate L, are traversed by the shanks of the set-screws $A^4$ $L^4$, respectively, as the carriage is adjusted horizontally for the purpose described.

The tightening of the set-screw $A^4$ holds the slide-bed K to its adjustment, and the tightening of the nut on the set-screw $L^4$ performs the same office for the carriage itself.

The carriage consists mainly of two portions, the bed-plate M, which slides in and out on the way-plate K, in the manner of a slide-rest, and the post M', in which are the bearings of the parts immediately concerned in supporting and operating the cutter.

The sliding of the carriage M M', carrying the cutter, is for the purpose of advancing and receding the latter toward and from the saw-blade, which is presented protruding from the jaws to such an extent that the cutter, in making teeth of the desired depth, shall not come in contact with the blade-holding parts of the apparatus.

The adjustment of the length of stroke of the carriage M M' upon the way K is made by two set-screws. The screw $k^1$ passes laterally through one of the cheeks of the bed-plate M, and enters a gain, $m$, cut in the edge of the way-plate K. As the plate M moves upon the plate K, say in the direction of the arrow, fig. 5, the metal of the latter plate, at the end of the slot $m$, fetches up against the set-screw, and thus limits the outward motion. In this direction the parts are not adjustable, as the impingement of the end of the slot upon the pin is the limit of outward movement under all circumstances.

The screw $k^2$ passes into a threaded socket in the end of the plate M, and has a shoulder, $k^3$, of larger diameter, which abuts upon the end of plate K when the carriage is pushed in, that is, the cutter at the end of its stroke in the saw-blade. By rotating this screw it is made to protrude to a greater or less extent, and, as the contact of the shoulder $k^3$ with the plate K is the limit of inward motion of the carriage, it is manifest that the extension of the screw will allow a greater range of motion. The limit of the inward motion is when the outer end of the slot $m$ comes in contact with the side of the screw $k^1$. The object of this adjustment of the length of stroke on the inward motion is for the purpose of cutting teeth of such depths as may be desired.

I will next consider the cutting apparatus, and will afterward refer to one more adjustment, namely, the means whereby the plane of revolution of the cutter is adjusted relatively to the plane of the saw-blade, so as to bring it obliquely across the face of the blade, to give the required bevel to the teeth.

N is an axle rotated by a crank, N', and turning within a collar or sleeve, O, which is an axial sleeve for the arm P, to which the cutter-mandrel R is secured.

$n$ is a key which secures the bevel-wheel S to the axle N. The web of this wheel is recessed, so that the wheel assumes the form of a segment of a hollow sphere.

The sleeve O is the axle of adjustment for the arm P. By loosening the screw $p$ the arm P may be revolved around the axle N, so as to vary the plane of revolution of the circular cutter T, which is sleeved upon a mandrel, U, projecting from the arm, so as to intersect a prolongation of the axis N, and at right angles thereto. This adjustment has the effect of determining the plane of rotation of the cutter, without effecting in any way the connection with the driving devices.

A prolongation of the axis of N will always be in the plane of rotation of the cutter, and intersect the axis of the latter.

As the arm P is revolved on its sleeve O, the miter-wheels S V remain in mesh.

The point of intersection of the axes of the cutter T and axle N is at the apexes of the two cones, which describe the pitch-lines of these wheels.

The object of the adjustment of the arm P, and the consequent determination of the plane of revolution of the cutter, is to give the wheel any desired degree of obliquity relatively to the face edge of the saw-blade, and thus to produce what is termed the bevel of the tooth.

It will thus be seen that the adjustment of the carriage, as to its range of motion out and in, is for depth of tooth.

The adjustment of the carriage in a horizontal plane is for the hook of the tooth.

The adjustment of the cutter-mandrel in a vertical plane at right angles to its motion is for the bevel of the tooth.

The motion of the carriage inward is to its work, and the return is to allow the blade to be fed forward a distance equal to the pitch of the tooth.

*Claims.*

What I claim as new is—

1. The toothed feed-bar I, having a hinged arm, which is adjustable for varying widths of saws, substantially as and for the purpose described.

2. The toothed feed-bar I, with a deep groove, $i^1$, which is traversed by the index-wheel of the feed, the two features coacting to form a guide for the edge of the saw-blank relatively to the cutter.

3. The arrangement on one axis of the index-wheel G and feed-wheel H, when the latter is made to act intermittingly upon a toothed feed-bar, which impels the saw-blank, substantially as described.

4. The combination of the pairs of spring-bars which hold the upper and lower jaws of the saw-holder.

5. The jaw-pieces D D, journaled at their ends in the spring arms, so that the jaw-faces may have a capacity for adjustment parallel with the plane of the saw, whatever may be the thickness of the blade.

6. In combination with the spring jaw-pieces D D, the screw-clamps E E, for bringing the jaw-faces to the required relative adjustment for varying thicknesses of blades.

7. The carriage M M', having a sliding adjustment to and from the work, an adjustment in a horizontal plane, to give more or less hooking to the teeth, and carrying a cutter-stock capable of adjustment for varying obliquity of the teeth.

8. The combination of the crank-shaft and the concentric sleeve-shaft, the former carrying the driver-wheel and the latter forming an adjustable stock, carrying the driven pinion and the cutter-mandrel.

9. The driver-pinion, shaped as a hollow spherical segment, to admit in its concavity a point of the rim of the rotating cutter, substantially as described.

WILLIAM TUCKER.

Witnesses:
R. E. BOND,
GEORGE G. HOLLEY.